July 27, 1965  J. C. CRAWFORD, JR., ETAL  3,196,535
METHOD OF MAKING INSULATED HOSE CLAMPS
Original Filed Nov. 12, 1958  2 Sheets-Sheet 2
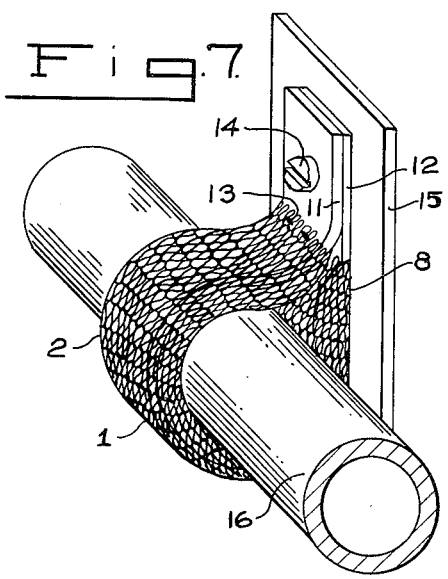
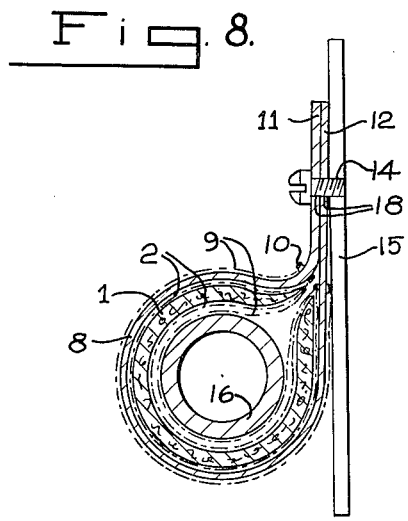
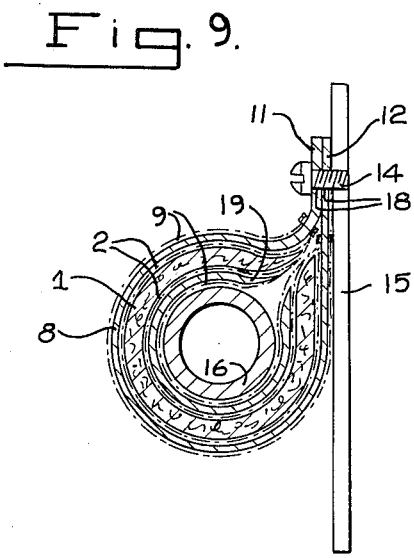
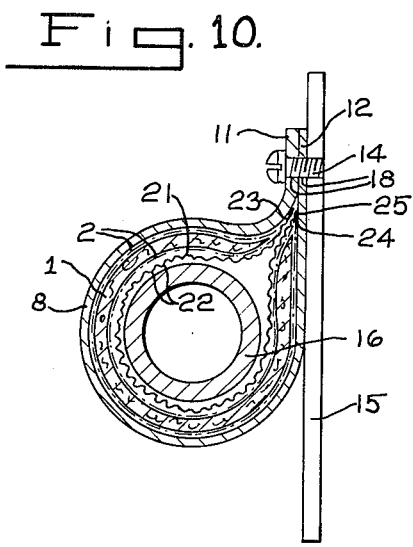
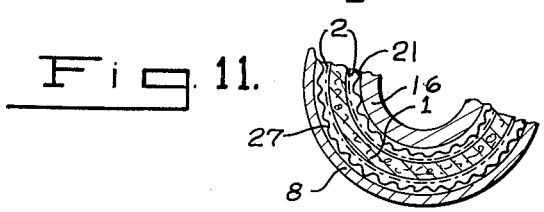
INVENTOR.
JAMES C. CRAWFORD, JR.
RALF L. HARTWELL
BY John A. McKinney
ATTORNEY United States Patent Office 3,196,535
Patented July 27, 1965

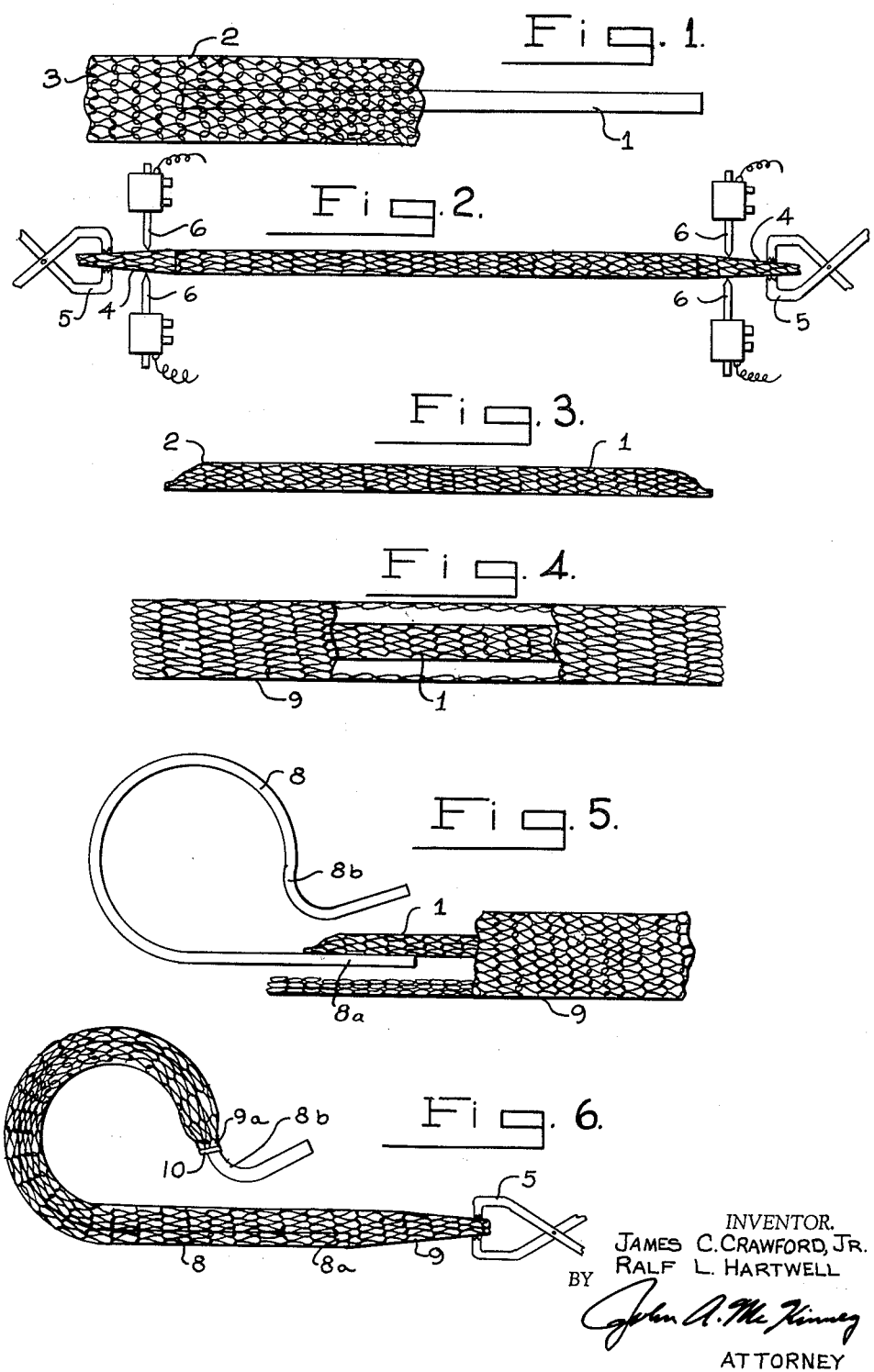

3,196,535
METHOD OF MAKING INSULATED HOSE CLAMPS
James C. Crawford, Jr., White Plains, N.Y., and Ralf L. Hartwell, Cranford, N.J., assignors to Johns-Manville Corporation, New York, N.Y., a corporation of New York
Original application Nov. 12, 1958, Ser. No. 773,474, now Patent No. 3,139,253, dated June 30, 1964. Divided and this application May 31, 1962, Ser. No. 216,940
2 Claims. (Cl. 29—446)

This invention relates to a clamp for holding various types of conduits and to the method of making such a clamp. More specifically, the invention provides a metal clamp with a resilient cushion of insulating material secured thereto for holding conduits or ducts in areas of extremely high temperatures, approximately 2000° F., and subjected to excessive vibrations. Such clamps are particularly suited for installation in aircraft, space traveling vehicles or projectiles, and the like, but are also intended for use in any desirable surroundings. This application is a division of our copending application Serial No. 773,474, filed November 12, 1958, and now Patent No. 3,139,253.

The general form of metal clamp for these purposes comprises a metal band or strip formed into a loop. To allow for dimensional irregularities and for the dampening of vibrations, the metal band or strip is encompassed with a resilient cushion. However, for high temperature operations, in the neighborhood of 2000° F., most cushions are not satisfactory. When high temperatures are to be encountered, it has been proposed to use material having high insulating qualities such as a suitably sized braided asbestos. However, such material rapidly deteriorates under the combination of high temperature and excessive vibration and begins to lose its structural integrity and flake off. Also, in aircraft installations, whenever the cushioning material is non-conductive, it is necessary to provide a bonding strip that will cooperate with the metal band or strip to equalize the potential between the air frame and the conduit to prevent static discharges which interfere with radio transmission and reception.

It is an object of this invention to provide a clamp for holding conduits in which the clamp is resistant to excessive vibration and high temperature.

It is another object of this invention to provide a method for making a clamp for holding conduits in a desired position in which the clamp is provided with a heat-resistant cushion.

It is a further object of this invention to provide a clamp for holding conduits in a desired position wherein the clamp is provided with a means for holding a heat resistant cushion in position on a metal strip and wherein said means also provides for equalizing the electric potential between the supporting structure and the conduit.

The foregoing objects are preferably accomplished in accordance with the instant invention by a metal clamp having a refractory fiber felt secured to the metal clamp so that the refractory fiber felt forms an insulating cushion on the inner surface of the clamp and is adapted to contact the conduit and to be held in position when the clamp is formed into a loop. In the prefered embodiment of the invention, the insulating cushion is designed to retain the integrity of the fibers in the insulating cushion and yet has sufficient flexibility so that the insulating cushion may readily conform to the inner contour of the loop forming the metal clamp. Furthermore, in the preferred embodiment, the insulating cushion encased in the flexible mesh envelope is secured to a pre-formed metal strip of the clamp by a second flexible mesh envelope that encases the pre-formed metal strip and the insulating cushion and is secured to the pre-formed metal strip by welding through an encircling retaining band. The second mesh envelope is preferably of heavier construction to protect the structure against abrasion and is also adaptable for bending within the radius of the metal strip without buckling. However it is to be understood that the invention is not to be limited to the preferred embodiment or to the forms illustrated and described in the following specification.

The preferred method for making the preferred clamp of the instant invention is to insert an insulating cushion encased in a first flexible mesh envelope within a relatively large second mesh envelope which fits loosely around the first flexible mesh encased insulating cushion. The free end of a preformed metal strip is inserted between the second flexible mesh envelope and the first flexible mesh encased insulating cushion. Suitable tension is applied to the second envelope to stretch the second envelope along its longitudinal axis to a narrower width and a smaller stitch opening so that the second flexible mesh envelope snugly encases the metal strip and the flexible mesh enclosed insulating cushion. The second flexible mesh envelope is secured to the metal strip adjacent to but spaced from each end of the strip by resistance welding through an encircling retaining band and the remaining ends of the second flexible mesh envelope are severed for removal. In other forms of the instant invention, various appropriate methods are used for securing the flexible mesh enclosed insulating cushion to the metal strip which is pre-formed into a loop.

The invention will be more fully understood and further objects and advantages thereof will become apparent when reference is made to the following detailed description of various embodiments of the invention and the accompanying drawings in which:

FIGS. 1 through 3 illustrate a method for enclosing an insulating cushion within a flexible mesh envelope;

FIG. 4 is a view with parts broken away to show a flexible mesh encased insulating cushion loosely within an open second flexible mesh envelope;

FIG. 5 is a view with part of one end of the open second mesh envelope broken away and illustrating the insertion of the end of a preformed clamp between the flexible mesh encased insulating cushion and the open second flexible mesh envelope;

FIG. 6 is a view showing the final portion of the assembly with the tension being applied to the other end of the second flexible mesh envelope;

FIG. 7 is a pictorial representation of a clamp made in accordance with the instant invention;

FIG. 8 is a view in cross-section showing the preferred embodiment of the clamp of the instant invention;

FIG. 9 is a view in cross-section of another type of clamp made in accordance with the instant invention;

FIG. 10 is a view in cross-section of another type of clamp made in accordance with the instant invention; and FIG. 11 is a view in cross-section of a part of another type of clamp made in accordance with the instant invention.

Referring to the drawings, there is illustrated in FIGS. 1–3 the method for encasing an insulating cushion 1 within a flexible metal mesh envelope 2. The insulating cushion 1 is placed within an open ended tubular metal mesh envelope 2 which, as illustrated in FIG. 1, is of sufficient tubular size in cross-section to receive loosely the insulating cushion 1. As shown in FIG. 1, the tubular mesh envelope 2 has a relatively open stitch 3. When the insulating cushion 1 is within the mesh envelope 2, a tension is applied to the ends 4 of the mesh envelope 2 by the jaws 5 so that the flexible mesh envelope 2 is stretched along its longitudinal axis. As the mesh envelope 2 is stretched, the lateral size or width of the stitch opening 3 decreases as a comparison of FIGS.

1 and 2 readily indicates. When the mesh envelope 2 has been stretched a distance, which may be predetermined, so that the mesh envelope is contiguous to the insulating cushion 1, the adjacent ends of the mesh envelope 2 are subjected to the resistance welding tips 6 and secured together to form a flexible mesh closure around the insulating cushion 1. In the product illustrated in FIG. 3, the insulating cushion 1 is a refractory fiber felt and is encased in a flexible knitted wire Inconel envelope. However, it is to be appreciated that the insulating cushion can be made of any desired insulating material, having similar physical characteristics, and the flexible mesh envelope could also be made of other suitable material.

The method of securing a flexible mesh enclosed insulating cushion to a metal strip 8 which is pre-formed into a loop to form a clamp for holding a conduit in a desired location is illustrated in FIGS. 4–6.

An insulating cushion 1 enclosed in a flexible mesh envelope 2 is inserted within a second open ended tubular flexible mesh envelope 9 which loosely receives the flexible mesh encased insulating cushion 1, as illustrated in FIG. 4. The free end 8a of the pre-formed metal strip 8, as shown in FIG. 5, is inserted between the flexible mesh encased insulating cushion 1 and the second open ended, tubular, flexible mesh envelope 9 and the relative movement between the pre-formed metal strip 8 and the flexible mesh encased insulating cushion 1 and the second flexible mesh envelope 9 is continued until the end 9a of the flexible mesh envelope 9 reaches the area 8b of the pre-formed strip 8. During this relative movement, the flexible mesh encased insulating cushion 1 has moved adjacent the inner surface of the loop portion of the metal strip 8 until its end adjacent the end 9a of the flexible mesh envelope 9 reaches the area 8b, as illustrated in FIG. 6, with the end 9a of the flexible mesh envelope 9 extending slightly beyond the end of the flexible mesh encased insulating cushion 1. The end 9a is then secured to the pre-formed strip 8 by welding. The end of the flexible mesh encased insulating cushion 1 adjacent the inner surface of the metal strip 8 near the area 8b thereof is held in position by any manner, such as by hand, and tension is then applied to the free other end of the mesh envelope 9 by the jaws 5 so that the tubular mesh envelope 9 is stretched along its longitudinal axis. As the mesh envelope 9 is stretched, the lateral size or width of the stitch opening decreases as a comparison of FIGS. 5 and 6 readily indicates. The tubular mesh envelope 9 is stretched a distance, which may be predetermined, until it is in contiguous relationship with the metal strip 8 and the flexible mesh enclosed insulating cushion 1. As illustrated in FIG. 8, the flexible mesh envelope 9 is now holding the flexible mesh encased insulating cushion 1 adjacent the inner surface of the metal strip 8. The section of the mesh envelope 9 extending beyond the insulating cushion 1 is secured, as by welding, adjacent the end 8a of the pre-formed metal strip 8, and the remaining portion of the mesh envelope is severed. A metal band 10 encircles each end of the tubular mesh envelope 9 and is subjected to the resistance welding tips 6 to secure further the insulating cushion 1 in proper position on the metal strip 8.

In the form of the invention illustrated in FIG. 7, a metal strip 8 has been bent into substantially a loop with its end portions 11 and 12 in mating superposed relationship. An insulating cushion 1 is secured in position on the inner surface of the loop formed by the metal strip 8 by a flexible mesh envelope 2 by a method similar to that described in relation to FIGS. 4–6, inclusive, and the flexible mesh envelope 2 is secured to the metal strip 8 by welds 13. The flexible mesh envelope 2 is contiguous to the inner surface of the insulating cushion 1 and to the outer surface of the metal strip 8 and functions to retain snugly the insulating cushion in proper position on the metal strip 8. A bolt 14 passes through aligned openings in the ends 11 and 12 and is threaded secured in the supporting structure 15. The clamp illustrated in FIG. 7 encircles the conduit 16 with the flexible mesh enclosed insulating cushion in contact therewith so that any vibrations of the conduits 16 are dampened thereby. The clamp thus functions to hold the conduit 16 in a desired position and to provide dampening action with high heat-resistant characteristics, as provided, for example, when a pad of felted refractory fiber is employed as the insulating cushion 1. The clamp illustrated in FIG. 7 may be formed by the method described above relative to FIGS. 4–6, inclusive, except that the insulating cushion is not encased within a first flexible mesh envelope before being retained in position on the metal strip 8.

The preferred embodiment of the instant invention is illustrated in FIG. 8 which shows a clamp made in accordance with the method illustrated in FIGS. 4–6. An insulating cushion 1, as previously described, is enclosed in a flexible mesh envelope 2 and is placed in superposed relationship on a metal strip 8. The enclosed insulating cushion is secured in proper position on the inner surface of the loop formed by the metal strip 8 by another flexible mesh envelope 9 which is secured to the metal strip 8 by the metal bands 10 which are welded thereto. If desired the ends of the mesh envelope 9 may be secured to the metal strip 8 by welding before the bands 10 are applied. A bolt 14 passes through aligned openings 18 in the ends 11 and 12 and is threadedly secured in the supporting structure 15. The clamp illustrated in FIG. 8 encircles the conduit 16 with the flexible mesh enclosed insulating cushion in contact therewith so that any vibrations of the conduit 16 are dampened thereby. The clamp thus functions to hold the conduit 16 in a desired position and to provide dampening action with high heat-resistant characteristics.

In FIG. 9, there is illustrated a form of the instant invention similar to that of FIG. 8. To protect further the insulating cushion 1, a strip of thin heat-resistant foil 19 is inserted between the mesh envelopes 2 and 9. This foil 19 functions to serve as a solid barrier against any tendency of the insulating cushion to flake out due to vibration. If desired, the foil 19 could contain transverse corrugations, at right angles to the length thereof, and of a suitable depth and pitch to prevent buckling when formed into a loop. The remainder of the structure and its function is in accordance with that described in connection with the clamp of FIG. 8.

In the form of the invention illustrated in FIG. 10, an insulating cushion 1 enclosed in a flexible mesh envelope 2 is secured in position on the inner surface of the loop formed by the metal strip 8 by a flexible heat-resistant foil strip 21. The foil strip 21 has a plurality of transverse corrugations 22, at right angles to the length thereof, which are of suitable depth and pitch to prevent buckling when formed into the loop. The ends 23 and 24 of the foil strip 21 are secured to the metal strip 8 by welds 25. In operation, the conduit 16 is snugly received within the encircling foil strip 21 so that the insulating cushion will dampen any vibrations and is held in desired position by the bolt 14 passing through aligned openings 18 in the ends 11 and 12 in the metal strip 8 and threadedly received in the supporting structure 15. The foil strip 21 serves as a solid barrier against any tendency of the insulating cushion to flake out due to vibration. The foil might also be extended around the edges of the insulating cushion 1 enclosed by the mesh 2 to provide still more complete protection from hot and corrosive gases, provided the foil is sufficiently flexible or is rendered sufficiently flexible by crimping, corrugating, kerfing, and dimpling, etc, as not to interfere with the overall flexibility and the functioning of the insulating cushion.

The form of the invention illustrated in FIG. 11 is similar to that illustrated in FIG. 10. A second heat-resistant corrugated foil strip 27 is positioned between the flexible mesh enclosed insulating cushion 1 and the metal strip 8. The corrugated foil strip 27 functions to allow cooling air to pass between the insulating cushion 1 and the metal strip 8. The clamp, illustrated in FIG. 11, functions to hold a conduit 16 in a desired position as explained in connection with the other forms of the invention, particularly that illustrated in FIG. 10.

In the forms of the invention illustrated herein, the insulating cushion was formed from a refractory fiber felt ⅛" in thickness, such as that marketed under the trademark Thermoflex RF–1200, and capable of withstanding temperatures to 2000° F. The tubular flexible mesh envelopes were made of knitted Inconel wire and had the characteristic of being readily adaptable to be stretched to a narrower width and a smaller stitch opening upon applying suitable tension along the longitudinal axis thereof. The heat-resistant foil strips disclosed herein were made from sheets of .004 Inconel metal cut to a predetermined length and then corrugated, in the forms of the invention in which corrugations were employed. The metal strips 8 forming the main body of the clamp were of standard design and shape, and adapted to withstand high temperatures in service. It is to be noted that the particulars given above are for illustration purposes only, and it is not intended to limit the invention thereto.

In operation, the instant invention provides a clamp for conduits in which the insulating cushion 1 functions as a resilient cushion capable of absorbing excessive vibration and at the same time possessing highly desirable high heat-resistant characteristics. The flexible mesh envelope retains the effective structural integrity of the insulating cushion and yet has sufficient flexibility to permit bending to conform to the desired contour of the clamp. In the preferred form of the invention, that illustrated in FIG. 8, the heavier outer mesh envelope serves to protect the structure against abrasion in addition to the other desired prevailing characteristics. The clamp provided by the instant invention cushions or dampens local vibrations without causing undue stresses in the supporting structure. Also, in the forms of the invention illustrated in the drawing, the clamp is provided with a metal surface in contact with the conduit so that it may serve as an electrical conductor, whether or not the insulating cushion itself will so function, for the purpose of equalizing the potential between the supporting structure and the conduit to prevent static discharges and in providing any other desired electrical property.

The insulated clamp of the instant invention possesses other highly desired characteristics. The insulating cushion of a refractory fiber felt is of itself heat-resistant and at the same time has a resilient nature to hold securely a conduit while dampening the excessive vibration thereof. The resiliency of the insulating cushion and the stretch of the flexible mesh envelope allows for the expansion of the conduit due to the heat of the surroundings. Thus, as the conduit expands to a greater diameter, the resiliency of the insulating cushion will absorb the expansion of the conduit without undue binding of the clamp on the conduit, such binding being undesirable as it tends to prevent the normal relative longitudinal movement between the clamp and the conduit which occurs upon expansion and contraction of the conduit.

Having thus described the invention in rather full detail, it will be understood that these details need not be strictly adhered to and that various changes and modifications may suggest themselves to one skilled in the art, all falling within the scope of the invention as defined by the subjoined claims.

What we claim is:

1. A method for making a heat and vibration-resistant clamp for holding conduits in a desired location comprising:
   (a) positioning an insulating cushion within a loosely fitting, open-ended, tubular, knitted wire, mesh envelope,
   (b) said insulating cushion comprising a heat-resistant material adapted to dampen vibrations,
   (c) inserting one end of a preformed metal strip having end portions and an intermediate portion, preformed into a loop corresponding to the shape of the conduit to be held, between said insulating cushion and said tubular, knitted wire, mesh envelope,
   (d) positioning said insulating cushion and said tubular, knitted wire, mesh envelope relative to said preformed metal strip by relative movement between said metal strip and said insulating cushion and said tubular, knitted wire, mesh envelope so that said insulating cushion forms a second loop having a radius of curvature smaller than said first loop and said tubular, knitted wire, mesh envelope surrounds said insulating cushion and said metal strip,
   (e) securing one end of said tubular, knitted wire, mesh envelope to said preformed metal strip adjacent but spaced from the other end of said preformed metal strip,
   (f) applying tension to the other end of said tubular, knitted wire, mesh envelope to stretch said tubular, knitted wire, mesh envelope along its longitudinal axis while holding said insulating cushion in position adjacent the inner peripheral surface of said loop portion of said metal strip,
   (g) stretching said tubular, knitted wire, mesh envelope to reduce the longitudinal cross-sectional configuration thereof until it is contiguous to the inner surface of said insulating cushion and the outer surface of said preformed metal strip,
   (h) securing the stretched tubular, knitted wire, mesh envelope to said preformed metal strip adjacent but spaced from said one end of said preformed metal strip, and
   (i) severing the remaining portion of said stretched tubular, knitted wire, mesh envelope.

2. A method for making a heat and vibration-resistant clamp for holding conduits in a desired location comprising:
   (a) encasing an insulating cushion within a tubular, knitted wire, mesh envelope with said tubular, knitted wire, mesh envelope being contiguous thereto,
   (b) said encased insulating cushion comprising a heat-resistant material adapted to dampen vibrations,
   (c) positioning said encased insulating cushion within a loosely fitting, open-ended, tubular, knitted wire, mesh envelope,
   (d) inserting one end of a preformed metal strip having end portions and an intermediate portion, preformed into a loop corresponding to the shape of the conduit to be held, between said encased insulating cushion and said tubular, knitted wire, mesh envelope,
   (e) positioning said encased insulating cushion and said tubular, knitted wire, mesh envelope relative to said preformed metal strip by relative movement between said metal strip and said encased insulating cushion and said tubular, knitted wire, mesh envelope so that said encased insulating cushion forms a second loop having a radius of curvature smaller than said first loop and said tubular, knitted wire, mesh envelope surrounds said encased insulating cushion and said metal strip,
   (f) securing one end of said tubular, knitted wire, mesh envelope to said preformed metal strip adjacent but spaced from the other end of said preformed metal strip,
   (g) applying tension to the other end of said tubular, knitted wire, mesh envelope to stretch said tubular, knitted wire, mesh envelope along its longitudinal axis while holding said encased insulating cushion in position adjacent the inner peripheral surface of said loop portion of said metal strip, (h) stretching said tubular, knitted wire, mesh envelope to reduce the longitudinal cross-sectional configuration thereof until it is contiguous to the inner surface of said encased insulating cushion and the outer surface of said preformed metal strip, (i) securing the stretched tubular, knitted wire, mesh envelope to said preformed metal strip adjacent but spaced from said one end of said preformed metal strip, and (j) severing the remaining portion of said stretched tubular, knitted wire, mesh envelope.

References Cited by the Examiner

UNITED STATES PATENTS

| | | | |
|---|---|---|---|
| 2,908,123 | 10/59 | Muller et al. | 53—37 X |
| 2,923,760 | 2/60 | Famely | 248—74 X |
| 3,015,465 | 1/62 | Schmitt | 248—74 |

JOHN F. CAMPBELL, *Primary Examiner.*